United States Patent
Kim

(10) Patent No.: US 7,450,555 B2
(45) Date of Patent: Nov. 11, 2008

(54) METHOD OF SETTING INITIAL TRANSPORT FORMAT COMBINATION IN BROADBAND CODE DIVISION MULTIPLE ACCESS SYSTEM

(75) Inventor: So-Hyun Kim, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 845 days.

(21) Appl. No.: 10/614,957

(22) Filed: Jul. 8, 2003

(65) Prior Publication Data

US 2004/0008659 A1    Jan. 15, 2004

(30) Foreign Application Priority Data

Jul. 8, 2002  (KR) .............................. 2002-39502

(51) Int. Cl.
    *H04Q 7/24*    (2006.01)
(52) U.S. Cl. ..................... 370/342; 370/235; 370/236; 370/329; 455/450; 455/452.1
(58) Field of Classification Search ................. 370/342, 370/368, 232, 477, 235, 236, 329; 455/450, 455/452.1
    See application file for complete search history.

(56) References Cited

U.S. PATENT DOCUMENTS

| | | | |
|---|---|---|---|
| 6,826,193 B1 * | 11/2004 | Peisa ........................... 370/437 |
| 7,050,415 B2 * | 5/2006 | Herrmann et al. ............ 370/338 |
| 2002/0114280 A1 * | 8/2002 | Yi et al. ....................... 370/235 |
| 2002/0136181 A1 * | 9/2002 | Belaiche et al. .............. 370/337 |
| 2003/0203736 A1 * | 10/2003 | Chi et al. ..................... 455/450 |
| 2006/0062193 A1 * | 3/2006 | Choi et al. ................... 370/342 |
| 2006/0268821 A1 * | 11/2006 | Terry ........................... 370/349 |

\* cited by examiner

*Primary Examiner*—George Eng
*Assistant Examiner*—Brandon J Miller
(74) *Attorney, Agent, or Firm*—The Farrell Law Firm, PC

(57) ABSTRACT

Disclosed is a method of setting an initial transport format combination (TFC) in a MAC layer of a CDMA system. the MAC layer selects the initial maximum useable TFC value using transport format set (TFS) and transport format combination set (TFCS) information received from a radio resource control (RRC) layer during an initialization of a channel setting among respective layers, and sets the initial maximum useable TFC by transmitting the initial maximum useable packet data unit (PDU) value to the respective radio link control (RLC) layers according to the selected initial maximum useable TFC value. The RLC layer sets the proper maximum PDU by comparing the initial maximum useable PDU value predetermined during the above process with buffer occupancy (BO), and if the initial data is generated, it transmits the data of a proper size to the MAC layer at the transmission time interval (TTI) when the initial data is generated.

7 Claims, 5 Drawing Sheets

METHOD OF SETTING INITIAL TRANSPORT FORMAT COMBINATION IN BROADBAND CODE DIVISION MULTIPLE ACCESS SYSTEM

PRIORITY

This application claims priority to an application entitled "Method Of Setting Initial Transport Format Combination In Broadband Code Division Multiple Access System" filed in the Korean Industrial Property Office on Jul. 8, 2002 and assigned Serial No. 2002-39502, the contents of which are hereby incorporated by reference.

BACKGROUND OF THE INVENTION

1. Field of the Invention

The present invention relates to a data communication in an asynchronous broadband code division multiple access (CDMA) system, and more particularly to a method of setting a transport format combination (TFC) of a medium access control (MAC) layer during the data transmission.

2. Description of the Related Art

In brief, an asynchronous CDMA system has three layers. The first layer is a physical layer in charge of a radio transmission. The second layer is composed of a radio link control (RLC) layer in charge of a reliable data transmission, and a medium access control (MAC) layer in charge of a providing simultaneous and effective transmission of a plurality of services. The third layer is composed of a call control (CC) layer in charge of a call determination and release, a mobility management (MM) layer in charge of an authentication and registration of a service user, and a radio resource control (RRC) layer in charge of a radio resource allocation and management.

In the above-described layer structure, the MAC layer converts a logic channel of the RLC layer into a transmission channel and transmits data to a lower layer, or converts the transmission channel into a logic channel and transmits the data to an upper layer. Accordingly, the MAC layer is provided with a MAC-c/sh module in charge of the transmission/reception of a common/shared transport channel and a MAC-d module in charge of the transmission/reception of a dedicated transport channel. The MAC layer is also provided with a transport format combination (TFC) selection module for mapping the logic channel of the RLC layer on the transmission channel of the MAC layer and adjusting the size of the transmitted/received data during the data transmission.

The radio link control (RLC) layer divides/integrates the data received from the upper layer, and transmits the divided/integrated data to the logic channel of the MAC layer. The RLC is classified into a transparent (TR) mode, an unacknowledged (UM) mode, and an acknowledged (AM) mode. The RLC stores the data received from the upper layer in a transmission buffer, and divides/integrates the data stored in the buffer to a size as large as the size of a packet data unit (PDU) and the number of blocks to transmit the divided/integrated data to the MAC layer.

At this time, according to the 3GPP MAC spec (TS 25.321 3.8.0) of the asynchronous CDMA system, the size of the transmissible PDU and the number of blocks for each transmission time interval (TTI) of the RLC layer are set by the MAC layer. The MAC layer receives a transport format combination set (TFCS) and priority information of the respective logic channels from the radio resource control (RRC) layer. Thereafter, if the MAC layer receives the data and buffer occupancy (BO) information to be transmitted from the RLC layer to the MAC layer, it selects a proper TFC from the TFCS based on the BO and the priority of the respective logic channels, and transmits the size of the PDU and the number of blocks that can be used for the next TTI to the RLC layer to set the TFC.

However, the conventional TFC setting process as described above is inefficient in setting the size of the PDU and the number of blocks to be used when the RLC initially transmits the data. In the conventional TFC setting process, in order for the RLC to transmit the data to the MAC at the m-th TTI, the RLC should have already received from the MAC layer at the (m−1)-th TTI. the information on the useable PDU size and the number of blocks. Accordingly, the MAC layer receives the BO information from the RLC at the (m−1)-th TTI. In repeating this process, there is a contradiction in that the MAC cannot inform the RLC the PDU size and the block number of the data to be transmitted at the zeroth TTI.

Setting of a certain initial value in order to solve this problem cannot maximize the performance of the present TFC setting process. Also, the RLC layer cannot send the data by setting the PDU size and the block number by itself. This is because the RLC layer cannot set the transmissible PDU size and the block number since it only knows its own BO information and does not know the BO information of any other RLC layer being simultaneously transmitted.

Thus, according to the conventional TFC setting process, the RLC layer does not transmit the data for the first TTI, but transmits only BO information to the MAC layer during the initial data transmission even in order to set the initial value of the RFC. The MAC layer indicates to the RLC the PDU size and the block number transmissible at the next TTI. However, this process causes a time delay in the transmission of the data, which must be presently transmitted, until the MAC layer transmits the transmissible PDU size and the block number, and thus quality deteriorates during voice and moving picture services.

SUMMARY OF THE INVENTION

Accordingly, the present invention has been made to solve the above-mentioned problems occurring in the prior art, and an object of the present invention is to provide a method of setting an initial TFC that can minimize the performance of the TFC setting method.

It is another object of the present invention to provide a method of setting an initial TFC that can provide high-quality voice and moving picture services.

In order to accomplish these objects, there is provided a method of setting a transport format combination (TFC) in a broadband code division multiple access (CDMA) communication system, wherein a radio resource control (RRC) layer transmits transport format set (TFS) information and transport format combination set (TFCS) information during channel initialization for data transmission among respective layers of the broadband CDMA communication system, a medium access control (MAC) layer selects an initial TFC in a manner such that it preferentially allocates a maximum packet data unit (PDU) value to a transmission channel on which a logic channel having a relatively high priority is mapped by analyzing the received TFS information and the TFCS information, the MAC layer transmits the initial PDU value to a radio link control (RLC) layer including respective logic channels by allocating an initial PDU value according to the initial TFC to the respective logic channels, and of the RLC layer receives the initial PDU value, and sets the initial PDU value as a final PDU value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a method of setting a transport format combination (TFC) in a broadband code division multiple access (CDMA) communication system according to preferred embodiments of the present invention will be described with reference to the accompanying drawings. In the following description of the present invention, a detailed description of known functions and configurations incorporated herein will be omitted as it may cloud the subject matter of the present invention.

The present invention is directed to an initial TFC setting process in the TFC setting process of the MAC layer of the CDMA system. According to the present invention, a MAC layer selects the initial maximum useable TFC value using TFS and TFCS information received from an RRC layer during an initialization of a channel setting among respective layers, and sets the initial maximum useable TFC by transmitting the initial maximum useable PDU value to the respective RLC layers according to the selected initial maximum useable TFC value. The RLC layer sets the proper maximum PDU by comparing the initial maximum useable PDU value, predetermined during the above process, with the BO, and if the initial data is generated, it transmits the data in a proper size to the MAC layer at the TTI when the initial data is generated. For easy understanding the present invention, a message flow among the respective layers will be explained with reference to FIG. 1, which shows the message flow among the respective layers according to an embodiment of the present invention.

Figure 1:
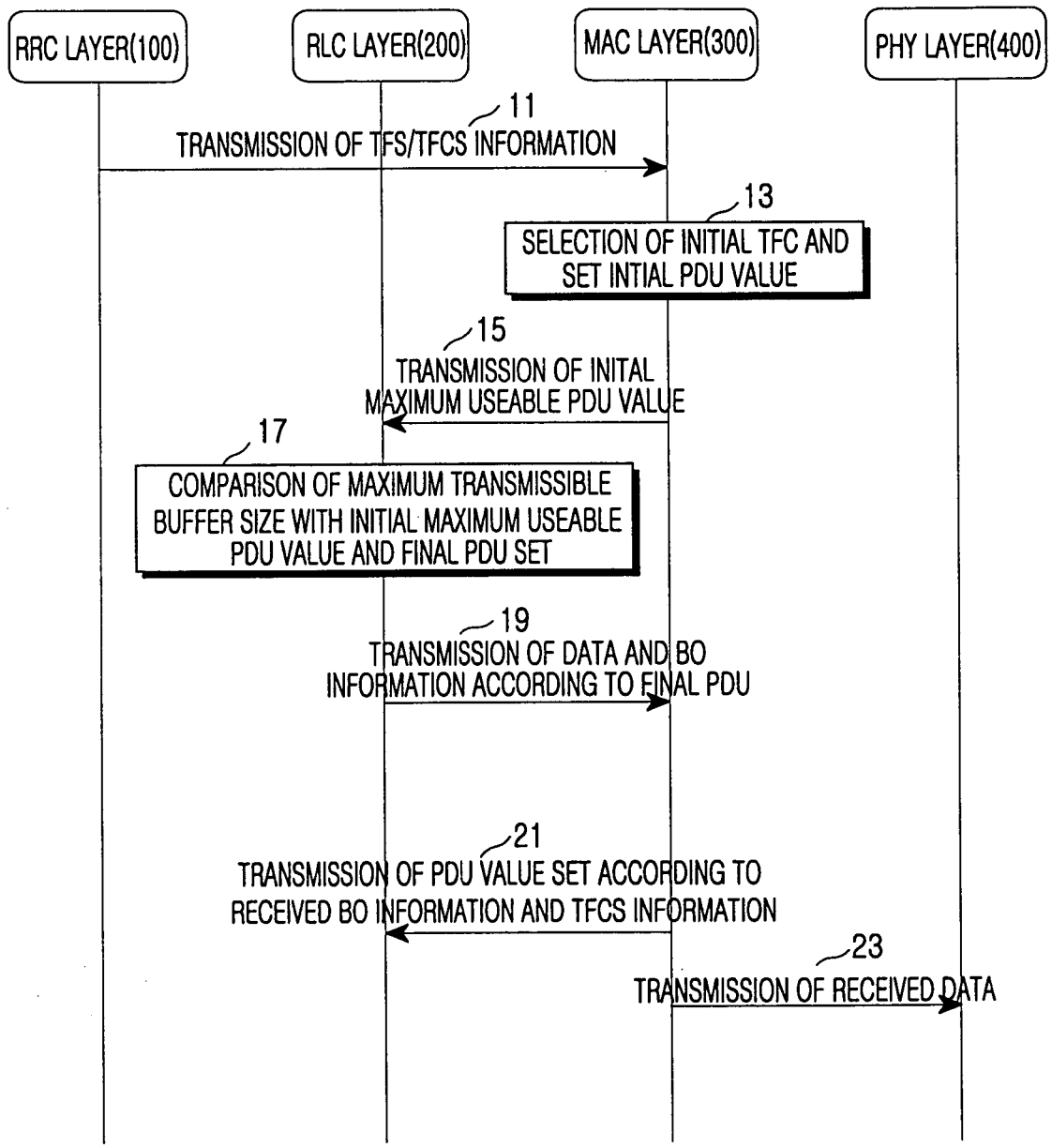
FIG. 1 is a message flow diagram depicting the flow of messages among respective layers according to an embodiment of the present invention.

Referring to FIG. 1, at step 11, an RRC layer 100 transmits logic channel mapping state information of respective transmission channels, priority information of respective logic channels, and TFS information and TFCS information of transmission channels to the MAC layer 300, through a construction request (CMAC_CONIRIG_REQ) primitive, during a channel initialization for data transmission among the respective layers. The TFS information is information on the transmissible PDU size and the number of the respective transmission channels.

The TFCS information defines a range of service multiplexing that can be performed in the MAC layer 100, and is composed of a plurality of TFCs having PDU values which the respective transmission channels can transmit during a simultaneous data transmission over the transmission channels.

At step 13, the MAC layer 300 selects the initial maximum useable TFC value using the received TFS information and the TFCS information, and sets the initial maximum useable PDU value of the respective logic channels according to the selected TFC value. The selection of the initial TFC according to the embodiment of the present invention will be performed through the following process. If the TFS information and the TFCS information are received, the MAC layer 300 checks the priority of the logic channels mapped on the respective transmission channels, and selects the TFC set so that the maximum PDU value is allocated to the transmission channel on which the logic channel having the highest priority in the TFCS is mapped. If a plurality of TFCs are selected, the MAC layer 300 selects among the plural selected TFCs a TFC which is set in such a manner that the maximum PDU value can be allocated to the transmission channel on which the logic channel having the next-to-highest priority in the TFCS is mapped. By repeating this process, a final TFC is selected, and the selected TFC is set as the initial TFC.

According to the initial TFC value, the PDU value of the respective transmission channel, i.e., the PDU size and number of the data, is set. Mapped on the respective transmission channel is at least one logic channel. If one logic channel is mapped on the transmission channel, the PDU value of the corresponding transmission channel according to the initial TFC value is set as the PDU value of the logic channel. If a plurality of logic channels are mapped on the transmission channel, the PDU value of the transmission channel corresponding to the logic channel having the highest priority among the plurality of logic channels is set as the PDU value of the corresponding logic channel. By the above-described process, the initial maximum useable PDU value is set.

If the selection of the initial maximum useable TFC and the setting of the initial maximum useable PDU are completed, the MAC layer 300 sets the initial maximum useable TFC by transmitting the initial maximum useable PDU information, based on the respective logic channels, to the RLC layer 200 through an initial status indication primitive (MAC_INIT_STATUS_IND) at step 15. The initial status indication primitive is a newly added primitive according to the present invention, and contains the number of PDU blocks and the size of the PDU as its variables.

At step 17, the RLC layer 200 that received the initial status indication primitive sets a proper PDU value as the final PDU value by comparing the initial maximum useable PDU value with the BO. Thereafter, if the data to be transmitted to the upper layer is received, the RLC layer 200 proceeds to step 19, and transmits to the MAC layer 300 the data according to the set PDU value and the BO information of the present RLC layer 200 through a data transmission request (MAC_DATA_RDQ) primitive.

The MAC layer 300 selects the proper TFC using the received BO information and the TFCS information, sets the PDU value according to the selected TFC, and transmits to the RLC layer 200 the PDU value through a status information (MAC_STATUS_IND) primitive at step 21. At this time, the process of setting the PDU value follows the general PDU setting process. Thereafter, the MAC layer 300 transmits the data received from the RLC layer 200 to a physical (PHY) layer 400 at step 23.

As the data is generated, the RLC layer 200 and the MAC layer 300 repeat steps 19 to 23 before performing the channel process setting, and thus the RLC layer 200 transmits/receives the data to/from the MAC layer 30.

Figure 2:
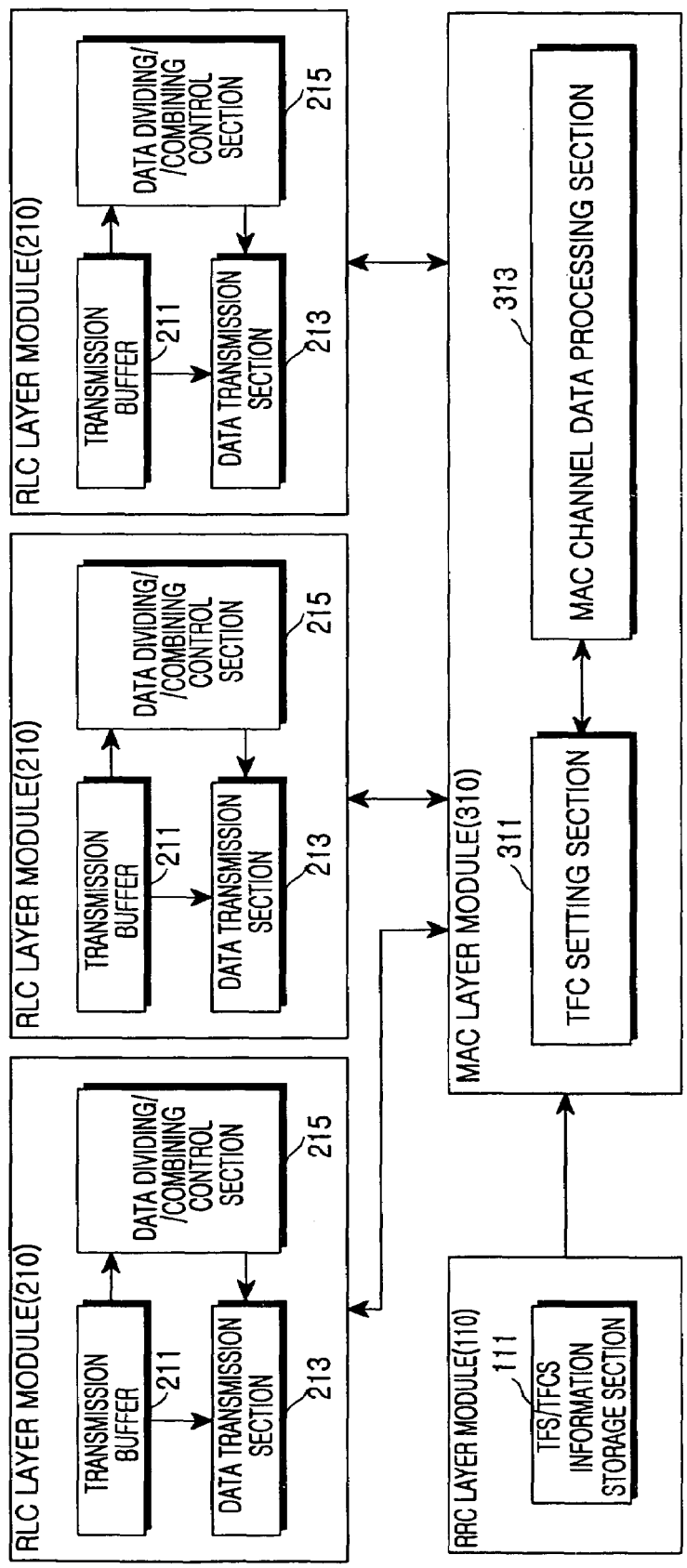
FIG. 2 is a diagram illustrating a radio link control (RLC) layer and a medium access control (MAC) layer according to an embodiment of the present invention.

FIG. 2 shows the construction of the respective layers for transmitting/receiving the data as described above. In FIG. 2, the construction of a module that processes the function of the radio link control (RLC) layer and the medium access control (MAC) layer according to the embodiment of the present invention is illustrated. That is, FIG. 2 shows the structure in which an RRC layer module 110 and a plurality of RLC layer modules 210 are connected to one MAC layer module 310.

The RRC layer module 110 is provided with a TFS/TFCS information storage section 111. The TFS/TFCS information storage section 111 stores the TFS/TFCS information on the transmission channels of the MAC layer, and transmits the TFS/TFCS information to the MAC layer during the channel initialization among the respective layers.

The MAC layer module 310 is provided with a TFC setting section 311 and a MAC channel data processing section 313. The TFC setting section 311 stores the TFS/TFCS information received from the RLC layer module 210, sets a proper PDU value for the respective logic channels connected to the MAC layer module 310 using the stored TFS/TFCS information and the BO information, and transmits the proper PDU value to the RLC layer module 210. That is, the TFC setting section 311 selects the initial TFC using only the TFS/TFCS information during the channel initialization among the respective layers, sets the initial maximum useable PDU value of the respective logic channel according to the selected initial maximum useable TFC, and transmits the PDU value to the RLC layer module 210.

Thereafter, if the data is generated and received from the RLC layer module 210 along with the BO information, the TFC setting section 311 selects a proper RFC using the TFS/TFCS information and the BO information, sets the PDU value, and transmits the PDU value to the RLC module 210. The MAC channel data processing section 313 includes a MAC-c/sh module in charge of the transmission/reception of a common/shared transport channel and a MAC-d module in charge of the transmission/reception of a dedicated transport channel, and processes the data transmitted/received through the respective channels.

Each RLC layer module 210 comprises a transmission buffer 211, a data transmission section 213, and a data dividing/combining control section 215. The transmission buffer 211 is a buffer where the data to be received from the upper layer and transmitted to the MAC layer module 310 is temporarily stored. The BO information required during the TFC selection is BO information of the transmission buffer 211.

The transmission section 213 forms a PDU of a proper size by dividing or combining the data inputted from the transmission buffer 211 under the control of the dividing/combining control section 215, and transmits the PDU to the MAC layer module 310. According to the embodiment of the present invention, the dividing/combining control section 215 sets the final PDU size and number of the data to be transmitted to the MAC layer module 310 by comparing the PDU information received from the MAC layer module 310 with the present BO of the transmission buffer 211, and provides the set PDU size and number to the data transmission section 213.

In other words, the dividing/combining control section 215 compares the initial PDU value received from the MAC layer module 310 with the actual transmissible maximum BO value during the channel initialization. During the initial TFC setting, the MAC layer module 310 does not know the BO information of the RLC layer module 210, and the above comparing process is necessary in the RLC layer module 210. The dividing/combining control section 215 sets the initial PDU value as the final PDU value if the initial PDU value is smaller than the maximum BO value, while it sets the transmissible maximum BO value as the final PDU value if the initial PDU value is greater than the maximum BO value.

Thereafter, if the data to be transmitted is generated from the upper layer, the dividing/combining control section 215 transmits the PDU value set in the data transmission section 213. If the data to be transmitted is greater than the indicated PDU value, the data transmission section 213 divides the data so as to match the set PDU size and value to transmit the divided data.

If the data to be transmitted is less than the indicated PDU value, the data transmission section 213 transmits all the data. At this time, the data transmission section 213 also transmits the BO information to the MAC layer module 310.

The TFC setting section 311 of the MAC layer module 310 that received the BO information selects a proper TFC using the TFCS information and the received BO information, and transmits the PDU value according to the selected TFC value to the RLC layer module 210.

Thereafter, the dividing/combining control section 215 of the RLC layer module 210 indicates the received PDU value to the data transmission section 213, and in order to transmit the data transmission section 213 divides/combines the data according to the indicated PDU value.

Figure 3:
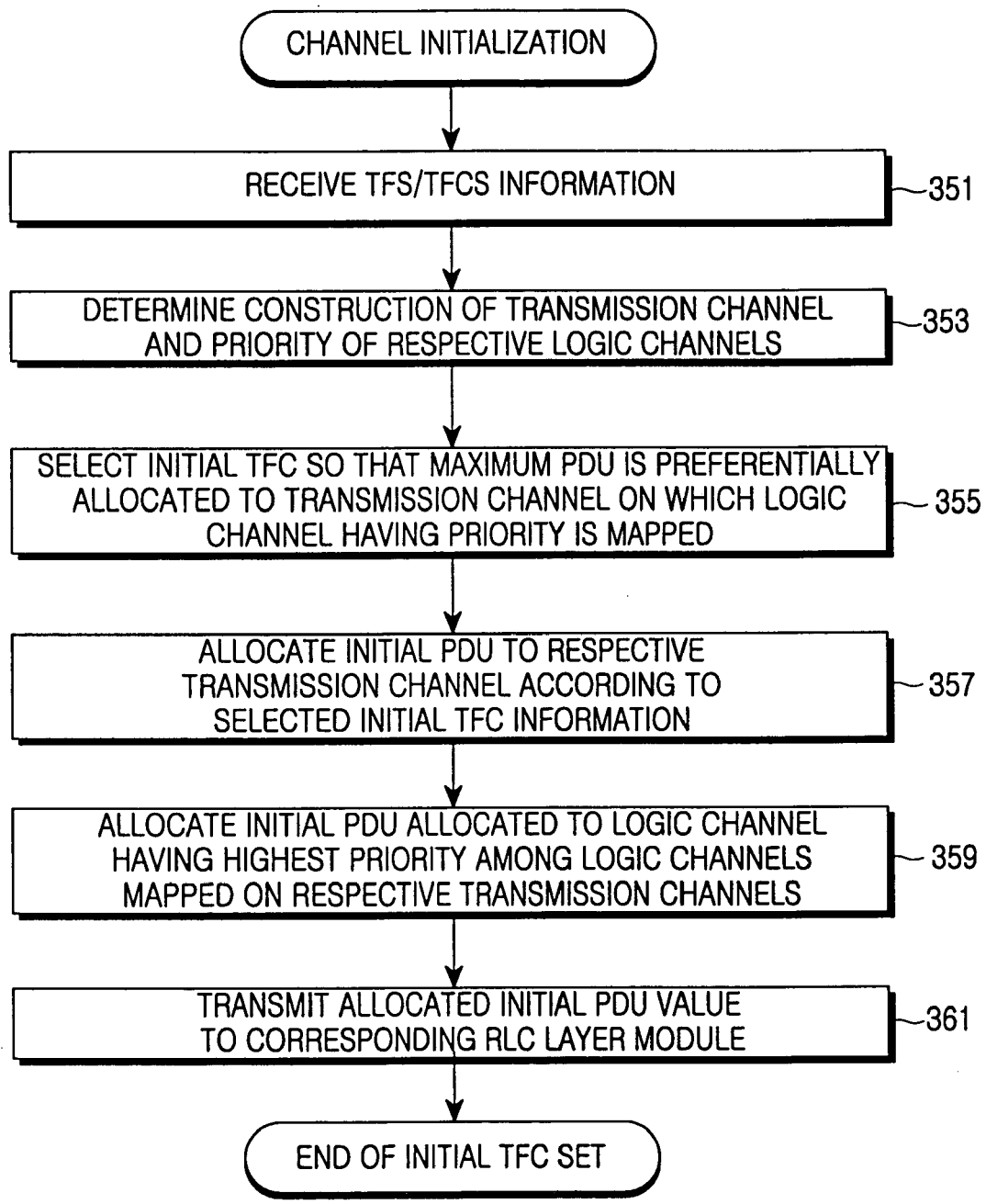
FIG. 3 is a diagram illustrating an initial transport format combination (TFC) setting process according to an embodiment of the present invention.
Figure 4:
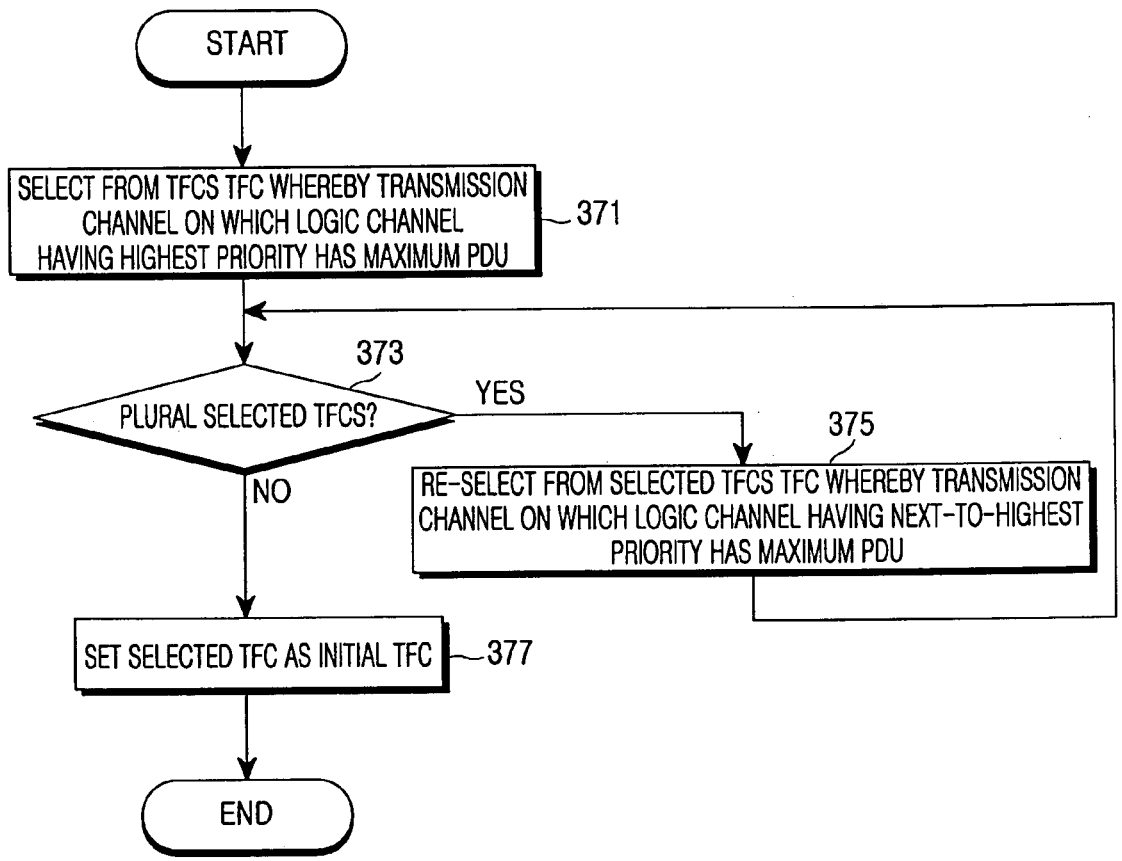
FIG. 4 is a diagram illustrating in detail an initial TFC selecting process according to an embodiment of the present invention.

The operation of the TFC setting section 311 according to the initial setting process of the MAC layer module 310 is illustrated in detail in FIGS. 3 and 4. FIG. 3 is a flow diagram illustrating the initial transport format combination (TFC) setting process according to an embodiment of the present invention, and FIG. 4 is a flow diagram illustrating in detail the initial TFC selecting process according to an embodiment of the present invention.

Hereinafter, the initial TFC setting process according to the present invention will be explained in an example where the MAC layer module 310 receives the TFS information as shown in Table 1 and the TFCS information as shown in Table 2, with reference to FIGS. 3 and 4.

Table 1 shows the TFS information, and Table 2 shows the TFCS information. In Tables 1 and 2, DCCH1, DCCH2, DCCH3, and DCCH4 are logic channels, DCH0 and DCH1 are transmission channels, and Table 2 is composed of the zeroth TFC to the eighth TFC.

TABLE 1

| Priority | DCCH1<br>1 | DCCH2<br>3 | DCCH3<br>4 | DTCH4<br>2 |
|---|---|---|---|---|
| TFI | | DCH0 | | DCH1 |
| TF0 | | 0*148 | | 0*336 |
| TF1 | | 1*148 | | 1*336 |
| TF2 | | | | 2*336 |
| TF3 | | | | 3*336 |
| TF4 | | | | 4*336 |

TABLE 2

| TFC | DCH0 | DCH1 |
|---|---|---|
| 0 | 0 | 0 |
| 1 | 1 | 0 |
| 2 | 0 | 1 |
| 3 | 1 | 1 |
| 4 | 0 | 2 |
| 5 | 1 | 2 |
| 6 | 0 | 3 |
| 7 | 1 | 3 |
| 8 | 0 | 4 |

Referring to FIG. 3, if the channel initialization of the respective layer starts, the TFC setting section 311 receives the TFS information and the TFCS information as shown in Tables 1 and 2 from the RRC layer module 110 at step 351, and proceeds to step 353. At step 353, the TFC setting section 311 checks the construction of the respective transmission channels and the priority of the respective logic channels, and proceeds to step 355. That is, the TFC setting section 311 determines that in the TFS information of Table 1, the logic channels DCCH1, DCCH2, and DCCH3 are mapped on the transmission channel DCH0, and the logic channel DCCH4 is mapped on the transmission channel DCH1. Also, the TFC setting section 311 determines that the transmission channel DCH0 can transmit one PDU of 148 bits at a maximum, and the transmission channel DCH1 can transmit four PDUs of 336 bits at a maximum. Also, the TFC setting section 311 determines that the respective logic channels have the priority in the order of DCCH1, DCCH4, DCCH2, and DCCH3. At step 355, the TFC setting section 311 selects the initial TFC whereby the maximum PDU is preferentially allocated to the transmission channel on which the logic channel having a high priority is mapped. Accordingly, the TFC setting section 311 selects the TFCs whereby the maximum PDU value is preferentially allocated to the transmission channel DCH0 on which the logic channel DCCH1 having the highest priority has been mapped in the embodiment according to Tables 1 and 2. Then, the TFC setting section 311 selects as the initial TFC the seventh TFC value set so as to allocate the maximum PDU to the transmission channel DCH1 on which the logic channel DTCH4 having the second priority among the selected TFCs has been mapped.

The detailed process of performing the initial TFC selection, in step 355 of FIG. 3, is illustrated in FIG. 4. Referring to FIG. 4, at step 371, the TFC setting section 311 selects from the TFCS the TFC whereby the transmission channel on which the logic channel having the maximum priority has the maximum PDU, based on the logic channel mapping status of the transmission channel and the priority information of the logic channels obtained in step 353 of FIG. 3, and then proceeds to step 373. At step 373, the TFC setting section 311 confirms whether the number of the selected TFCs is a plurality. If so, the TFC setting section 311 proceeds to step 375, whereas if not, it proceeds to step 377. At step 375, the TFC setting section 311 re-selects among the selected TFCs the TFC whereby the transmission channel on which the logic channel having the next priority is mapped has the maximum PDU value, and proceeds to step 373. Until one TFC is selected, the TFC setting section repeats performing of step 373 and step 375.

Meanwhile, since only one TFC is selected as a result of confirmation at step 373, the TFC setting section 311 sets the selected TFC as the initial TFC at step 373, and then proceeds to step 357 of FIG. 3.

If the above-described process is applied to the embodiment according to Tables 1 and 2, the TFC setting section 311 selects the first TFC, the third TFC, the fifth TFC, and the seventh TFC whereby the maximum number of PDUs are preferentially allocated to the transmission channel DCH0 on which the logic channel DCCH1 having the highest priority according to step 371 is mapped, and proceeds to step 373. At this time, since the number of selected TFCs is a plural, the TFC setting section proceeds to step 375. At step 375, the TFC setting section 311 selects among the first, third, fifth, and seventh TFCs the TFC that allocates the maximum number of PDUs to the transmission channel DCH1 on which the logic channel DTCH4 having the next priority, i.e., the second priority, has been mapped. The TFC that allocates the maximum number of PDUs to the transmission channel DCH1 among the selected TFCs is the seventh TFC that allocates 3 PDUs, and the TFC setting section 311 selects the seventh TFC. Then, the TFC setting section proceeds to step 373 to confirm that a single TFC is selected, and then proceeds to step 377 to set the seventh TFC as the initial TFC.

Referring again to FIG. 3, the TFC setting section 311 allocated the initial PDU to the respective transmission channels according to the initial TFC set at step 355 (in FIG. 4), and then proceeds to step 359. In the examples of Tables 1 and 2, one PDU is allocated to the transmission channel DCH0, and three PDUs are allocated to the transmission channel DCH1. At step 359, the TFC setting section 311 allocates the initial PDU to the logic channel having the highest priority among the logic channels mapped on the respective transmission channels, and proceeds to step 361. Since the priority of the logic channel DCCH1 is highest among the three logic channels mapped on the transmission channel DCH0 in the example of Tables 1 and 2, one PDU is allocated to the logic channel DCCH1. Also, since one logic channel DCCH4 is allocated to the transmission channel DCH1, three PDUs are allocated to the transmission channel DCCH4.

Then, at step 361, the TFC setting section 311 transmits the allocated initial PDU value to the corresponding RLC layer module 210 to terminate the initial TFC setting process.

Figure 5:
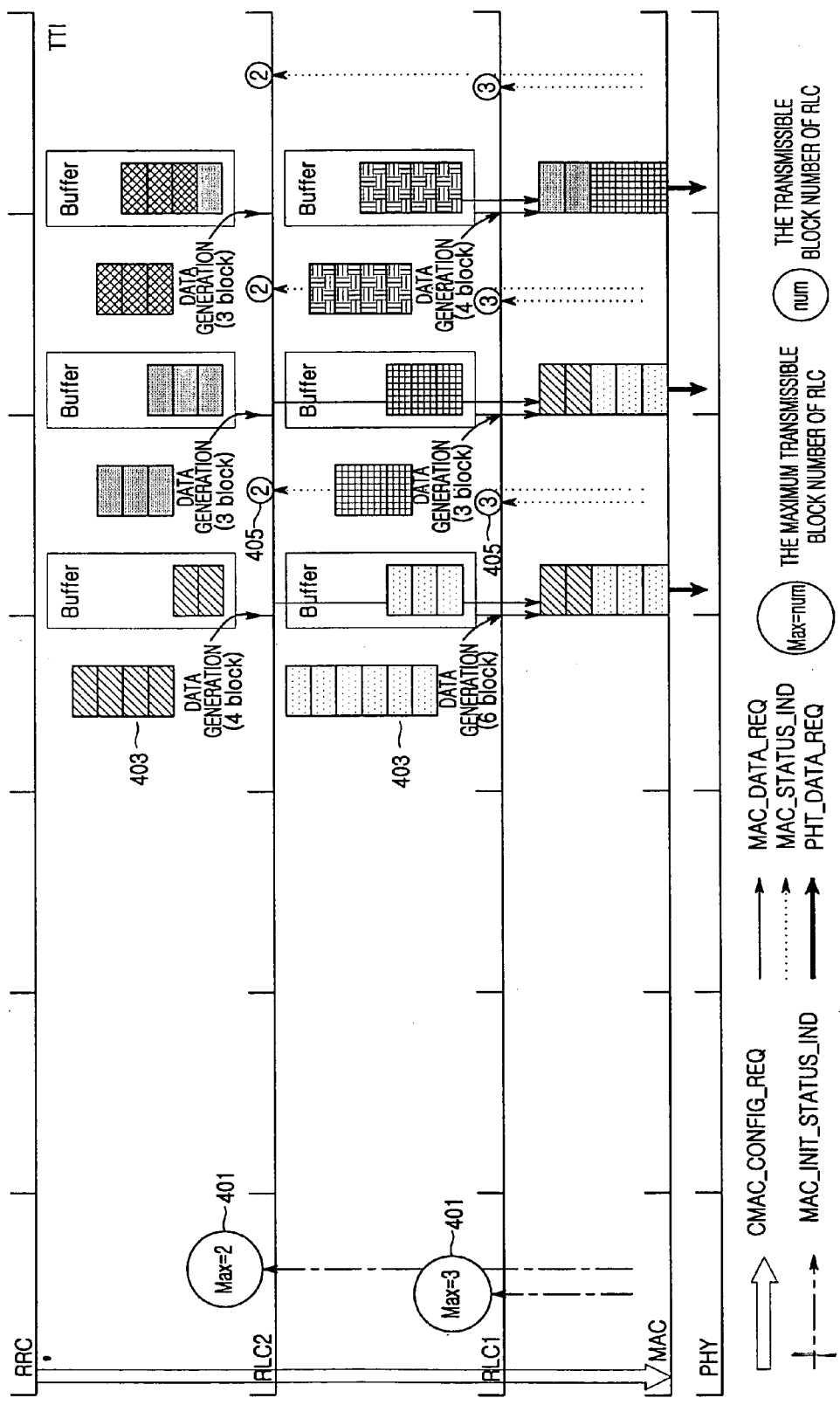
FIG. 5 is a diagram explaining data transmission/reception between a MAC layer module and an RLC layer module according to an embodiment of the present invention.

The primitive flow for setting the initial TFC through the above process and the actual data flow between the RLC layer 200 and the MAC layer 300 after setting the initial TFC are illustrated in FIG. 5. As shown in FIG. 5, during the initialization of the channel setting, the MAC layer 300 sets the initial TFC by transmitting the initial PDU value to the selected RLC1 layer and RLC2 layer using the TFS information and the TFCS information received from the RRC layer 100 at step 401. As shown in FIG. 5, the MAC layer 300 sets an initial PDU value to 3 in the RLC 1 layer and transmits the value 3. In addition, in the RLC 2 layer, an initial PDU value is set to 2. If the initial data is generated, the RLC1 and RLC2 layers divide and transmit the data generated according to the initial TFC predetermined in the MAC layer 300 at the TTI when the initial data is generated without any time delay, and then transmit the BO information. More specifically, at step 403, if the data generation is done at 6 blocks in RLC 1 layer and at 4 blocks in RLC 2 layer, the RLC 1 layer transmits the data of 3 blocks to the MAC layer and the RLC 2 layer transmits the data of 2 blocks to the MAC layer in accordance with the initial PDU values set by the MAC layer.

An then, at step 405, the MAC layer 300 transmits the received data to the physical layer 400, and transmits the proper PDU value according to the proper TFC to the RLC layer 200 using the BO information, TFS information, and TFCS information. In FIG. 5, the proper PDU value of the RLC 1 layer may be 3 and the proper PDU value of the RLC 2 layer may be 2. Accordingly, the RLC 1 layer and RLC 2 layer transmit the data of 3 blocks and 2 blocks, respectfully, to the MAC layer.

According to the foregoing, the RLC1 and RLC2 layer divide or combine the data with a proper size, and then transmit the data to the MAC layer 300 along with the BO information. By repeating this process, the data is transmitted. As described above, according to the method of setting the initial TFC according to the present invention, the MAC layer sets the initial TFC by selecting the initial TFC value using the TFS and TFCS information received from the RRC layer, and transmitting the initial PDU value to the respective RLC layers according to the selected initial TFC value. Thus, the performance of the TFC setting method can be maximized, and high-quality voice and moving picture services can be achieved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of setting a transport format combination (TFC) in a broadband code division multiple access (CDMA) communication system, the method comprising:
   a) transmitting from a radio resource control (RRC) layer both transport format set (TFS) information and transport format combination set (TFCS) information during a channel initialization for data transmission among respective layers of the broadband CDMA communication system;
   b) selecting at a medium access control (MAC) layer an initial TFC for preferentially allocating a maximum packet data unit (PDU) value to a transmission channel on which a logic channel having a relatively high priority among a plurality of transmission channels has been mapped, wherein said allocation is initially achieved by analyzing the received TFS information and the TFCS information;
   c) transmitting an initial PDU value from the MAC layer to a radio link control (RLC) layer including respective logic channels by allocating the initial PDU value according to the initial TFC to the respective logic channels before receiving buffer occupancy information from the radio link control (RLC) layer; and
   d) transmitting at the radio link control (RLC) layer initial transmission data along with buffer occupancy information of a transmission buffer to the MAC layer based on the received initial PDU value.

2. The method as claimed in claim 1, wherein the selecting step comprises:
   determining at the MAC layer a mapping status of the logic channels for the respective transmission channels, and determining a priority of the respective logic channels;
   selecting among the TFCS the TFC that allocates the maximum PDU value to the transmission channel on which the logic channel having the highest priority is mapped;
   re-selecting among selected TFCs the TFC that allocates the maximum PDU value to the transmission channel on which the logic channel having the next-to-highest priority is mapped if a plurality of TFCs are selected; and
   repeating the third substep until one of the TFCs is selected, and if one of the TFCs is selected, setting the TFC as the initial TFC.

3. The method as claimed in claim 1, wherein step c) comprises:
   allocating at the MAC layer the initial PDU value according to the initial TEC to the corresponding transmission channel;
   allocating the allocated initial PDU value to the logic channel having the highest priority among the logic channels mapped on the respective transmission channel; and
   transmitting the initial PDU value allocated to the logic channel to the RLC layer including the logic channel.

4. The method as claimed in claim 1, further comprising:
   comparing at the RLC layer the received initial PDU value and a maximum transmission amount of the transmission buffer provided in the RLC layer, and if the initial PDU value is larger than the maximum transmission amount, the RLC layer sets the maximum transmission value as the final PDU value, while if the initial PDU value is smaller than the maximum transmission amount, it sets the initial PDU value as the final PDU value.

5. The method as claimed in claim 1, further comprising:
   receiving at the RLC layer the initial PDU value transmitted to the MAC layer where the initial transmission data is generated along with buffer occupancy information of the transmission buffer by dividing or combining the initial transmission data according to a set final PDU value during the generation of the initial transmission data; and
   setting the received initial PDU value as the final PDU value.

6. A method of setting a transport format combination (TFC) in a broadband code division multiple access (CDMA) communication system, the method comprising the steps of:
   transmitting from a radio resource control (RRC) layer both transport format set (TFS) information and transport format combination set (TFCS) information during a channel initialization for data transmission among respective layers of the broadband CDMA communication system;
   selecting at a medium access control (MAC) layer an initial TFC using the received TFS information and the TFCS information, allocating an initial PDU value according to the initial TFC to the logic channels mapped on the corresponding transmission channel;
   transmitting from the medium access control (MAC) layer the initial PDU value to a radio link control (RLC) layer including the respective logic channels before receiving buffer occupancy information from the radio link control (RLC) layer; and
   transmitting at the radio link control (RLC) layer an initial transmission data along with buffer occupancy information of a transmission buffer to the MAC layer based on the received initial PDU value.

7. A method of setting a transport format combination (TFC) in a broadband code division multiple access (CDMA) communication system, the method comprising:
   receiving at a medium access control (MAC) layer both transport format set (TFS) information and transport format combination set (TFCS) information from a radio resource control (RRC) layer during a channel initialization for data transmission among respective layers of the broadband CDMA communication system;
   selecting an initial TFC by analyzing the received TFS information and the TFCS information, wherein the initial TFC preferentially allocates a maximum packet data unit (PDU) value to a transmission channel on which a logic channel having a relatively high priority among a plurality of transmission channels has been mapped;
   allocating an initial PDU value according to the initial TFC to the logic channels mapped on the corresponding transmission channel;
   transmitting the initial PDU value to a radio link control (RLC) layer including the respective logic channels before receiving buffer occupancy information from the radio link control (RLC) layer; and
   transmitting at the radio link control (RLC) layer initial transmission data along with buffer occupancy information of a transmission buffer to the MAC layer based on the received initial PDU value.

* * * * *